United States Patent
Cho et al.

(10) Patent No.: US 10,248,624 B2
(45) Date of Patent: Apr. 2, 2019

(54) METHOD AND SYSTEM FOR DOCUMENT SYNCHRONIZATION IN A DISTRIBUTED SERVER-CLIENT ENVIRONMENT

(71) Applicant: Fasoo.com Inc., Seoul (KR)

(72) Inventors: Kyugon Cho, Goyang-si (KR);
Hong-Joo Sohn, Goyang-si (KR);
Jung-Moon Oh, Seoul (KR);
Yeong-Kwang Moon, Seoul (KR)

(73) Assignee: Fasoo.com, Inc., Seoul (KR)

( * ) Notice: Subject to any disclaimer, the term of this patent is extended or adjusted under 35 U.S.C. 154(b) by 254 days.

(21) Appl. No.: 14/809,367

(22) Filed: Jul. 27, 2015

(65) Prior Publication Data
US 2016/0085838 A1 Mar. 24, 2016

(30) Foreign Application Priority Data
Jul. 31, 2014 (KR) .................. 10-2014-0098489

(51) Int. Cl.
*G06F 17/00* (2019.01)
*G06F 16/27* (2019.01)
*G06F 16/93* (2019.01)
*G06Q 10/10* (2012.01)

(52) U.S. Cl.
CPC .............. *G06F 16/27* (2019.01); *G06F 16/93* (2019.01); *G06Q 10/10* (2013.01); *G06Q 10/101* (2013.01)

(58) Field of Classification Search
None
See application file for complete search history.

(56) References Cited

U.S. PATENT DOCUMENTS

| 6,578,054 B1* | 6/2003 | Hopmann ......... G06F 17/30578 |
| | | 707/625 |
| 6,654,746 B1* | 11/2003 | Wong ................ G06F 17/30194 |
| 7,529,780 B1* | 5/2009 | Braginsky ........ G06F 17/30176 |
| 8,583,595 B2* | 11/2013 | Herbeck ........... G06F 17/30289 |
| | | 707/610 |
| 2003/0069874 A1* | 4/2003 | Hertzog ............... G06Q 10/109 |

(Continued)

FOREIGN PATENT DOCUMENTS

| KR | 1020100079370 A | 7/2010 |
| KR | 10-2010-0079370 | 10/2011 |

(Continued)

OTHER PUBLICATIONS

International Search Report for PCT/KR2015/007988 dated Nov. 10, 2015 from the Korean Intellectual Property Office.

*Primary Examiner* — Hung D Le
(74) *Attorney, Agent, or Firm* — Daniel H. Sherr, Esq.

(57) ABSTRACT

A method and system for synchronizing documents in a distributed server-client environment. The system includes a synchronization server, a distributor client, a user client, and/or a network connecting the server and the clients. The method includes the steps of wrapping synchronization information such as document ID and version number in a synchronized document, storing the synchronized document and the synchronization information in a synchronization server, and comparing the local version with the version stored in the sync server if a latest version is to open, and if the local version is not the latest version, accessing the latest version document by receiving the document from the synchronized server.

11 Claims, 13 Drawing Sheets

(56) References Cited

U.S. PATENT DOCUMENTS

Figure 1:
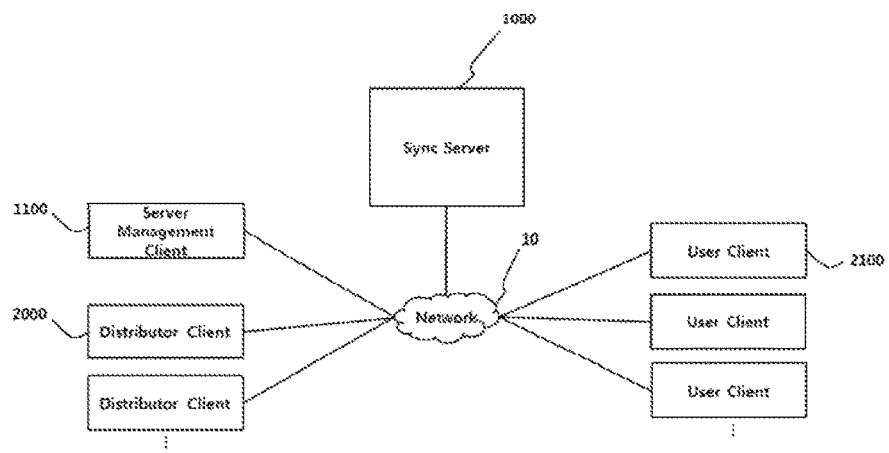

| | | | |
|---|---|---|---|
| 2005/0076094 A1* | 4/2005 | Sasaki | G06F 17/30581 709/217 |
| 2006/0101064 A1* | 5/2006 | Strong | G06F 17/30038 |
| 2006/0190506 A1 | 8/2006 | Rao et al. | |
| 2009/0100096 A1* | 4/2009 | Erlichson | H04L 67/02 |
| 2010/0313209 A1* | 12/2010 | Ryu | G06F 21/10 719/319 |
| 2012/0239620 A1* | 9/2012 | Masini | H04L 67/1095 707/634 |
| 2012/0297363 A1* | 11/2012 | Perisic | G06F 8/71 717/122 |
| 2012/0330887 A1* | 12/2012 | Young | G06F 17/30017 707/610 |
| 2012/0331061 A1* | 12/2012 | Lininger | G06F 17/5004 709/205 |
| 2013/0120368 A1* | 5/2013 | Miller | G06T 15/00 345/419 |
| 2013/0212067 A1* | 8/2013 | Piasecki | G06F 17/30176 707/620 |
| 2013/0218845 A1* | 8/2013 | Kleppner | G06F 17/24 707/687 |
| 2014/0068588 A1* | 3/2014 | Tan | G06F 8/67 717/169 |
| 2014/0201137 A1* | 7/2014 | Vibhor | H04L 29/0854 707/610 |
| 2014/0250219 A1* | 9/2014 | Hwang | G06F 17/2827 709/224 |
| 2014/0279846 A1* | 9/2014 | Srinivasan | G06F 17/30011 707/608 |
| 2014/0344453 A1* | 11/2014 | Varney | H04L 41/0803 709/224 |
| 2015/0012488 A1* | 1/2015 | van Rossum | G06F 17/30581 707/611 |
| 2015/0032690 A1* | 1/2015 | Hoque | G06F 17/30575 707/610 |
| 2015/0149904 A1* | 5/2015 | Hoerentrup | H02S 40/22 715/720 |
| 2015/0163286 A1* | 6/2015 | Wen | H04L 41/0816 709/203 |
| 2015/0249725 A1* | 9/2015 | Hurst | H04L 67/1095 709/203 |
| 2015/0350004 A1* | 12/2015 | Sekar | G06F 11/1662 709/248 |

FOREIGN PATENT DOCUMENTS

| | | |
|---|---|---|
| KR | 10-2011-0112002 | 10/2011 |
| KR | 1020110112002 A | 10/2011 |
| KR | 10-1231211 | 2/2013 |
| KR | 101231211 B1 | 2/2013 |

* cited by examiner

METHOD AND SYSTEM FOR DOCUMENT SYNCHRONIZATION IN A DISTRIBUTED SERVER-CLIENT ENVIRONMENT

The present application claims priority to Korean Patent Application No. 10-2014-0098489 filed on Jul. 31, 2014, which is hereby incorporated by reference in its entirety.

BACKGROUND

Embodiments relate to the field of document management and to document synchronization in a distributed server-client environment. It is an increasing trend for members inside and outside of an enterprise or business to collaborate toward a common task. In such collaboration, electronic document files are distributed by the authors of the documents for sharing by the collaborators. As smart devices such as smart phones and tablets proliferate, there is increased use of EMS (Enterprise Mobility Service), for example, that may connect to an enterprise legacy system.

In some related document management systems, if a revision occurs after a document creator first uploads a document for distribution, distribution of the subsequent revision is done by file transmission or download. For example, the document creator may upload the most recently revised document in the server so that other users can download that most recently revised document. Alternatively, the document creator may send emails to the users by attaching the most recently revised.

Some methods designate a local folder or storage to store a document for sharing. However, there may be limitations to this method because it requires users to connect to the server or check emails. In a distributed environment where users access documents from local computers, many local copies may exist. As a result, synchronization of documents can become relatively difficult. A distributor can broadcast the most recent version every time, but such broadcasting may cause serious network bandwidth problems.

SUMMARY

Embodiments relate to a method and system for synchronizing documents. The system includes a synchronization (sync) server, a distributor client, user clients, and/or a network interconnecting the sync server and the clients.

In embodiments, methods include wrapping synchronization information (e.g. document ID and/or version number) in a synchronized document (sync document), storing the documents and the synchronization information on a sync server recording the latest version, and/or checking the local version with the version stored in the sync server. In embodiments, if the local version is not the latest version, then the latest version of the document may be assessed by receiving the sync document from the sync server.

In embodiments, at a distributor client side, opening a distributor window for inputting sync information such as revision right holder information, stamp information, wrapping the sync information in a sync document, and/or uploading to a sync server.

In embodiments, at the user client side, opening a user window for inputting whether to use the sync document or a local document, transmitting a document ID to the sync server if the latest version is selected, and/or opening the latest version received from the sync server

DRAWINGS

Example FIG. 1 is an overall system configuration for document synchronization, in accordance with embodiments.

Figure 2:
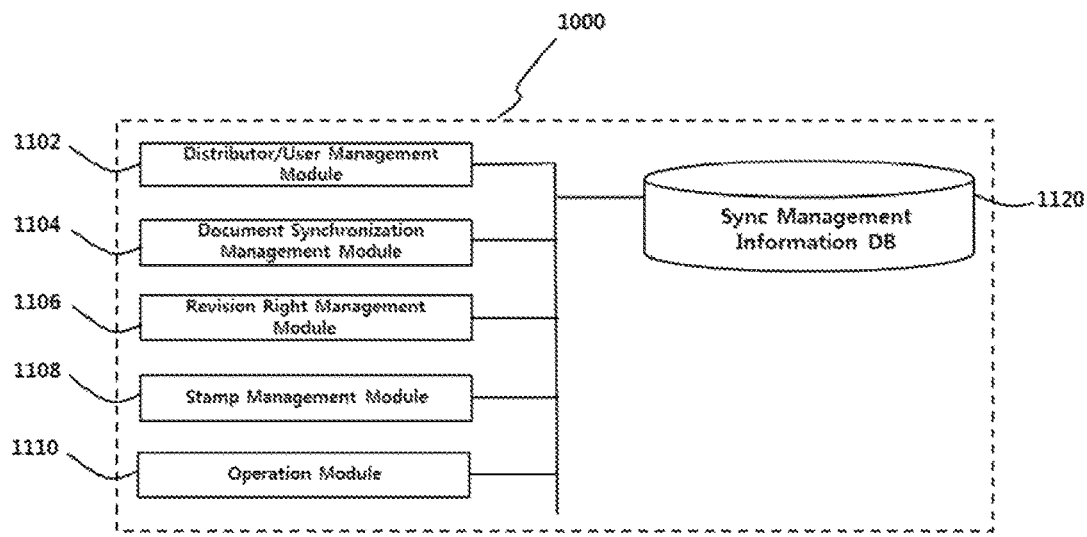

Example FIG. 2 is a configuration of a sync server consisting of functional modules, in accordance with embodiments.

Figure 3:
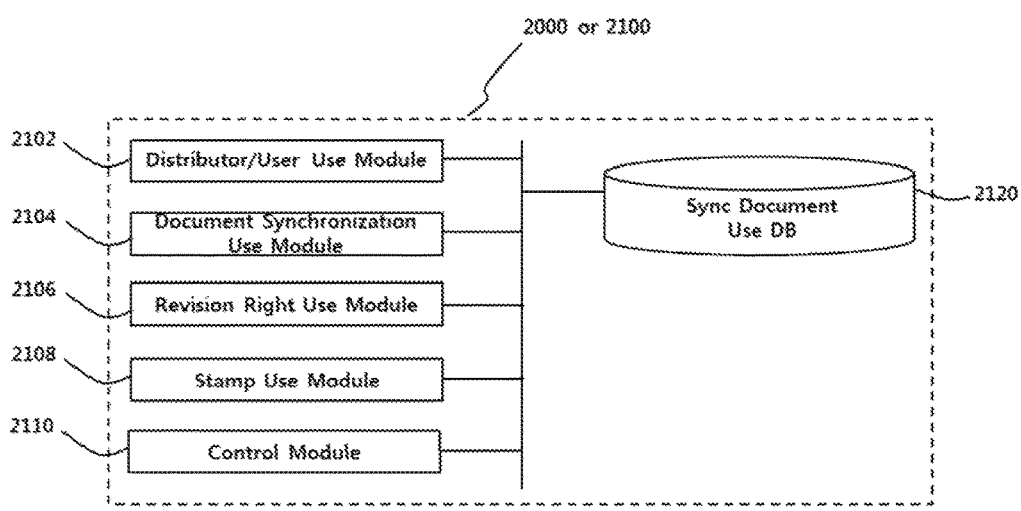

Example FIG. 3 is a configuration of client for a distributor or users, in accordance with embodiments.

Figure 4:
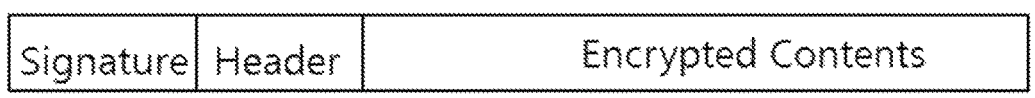

Example FIG. 4 is a file composition for wrapping sync information, in accordance with embodiments.

Figure 5:
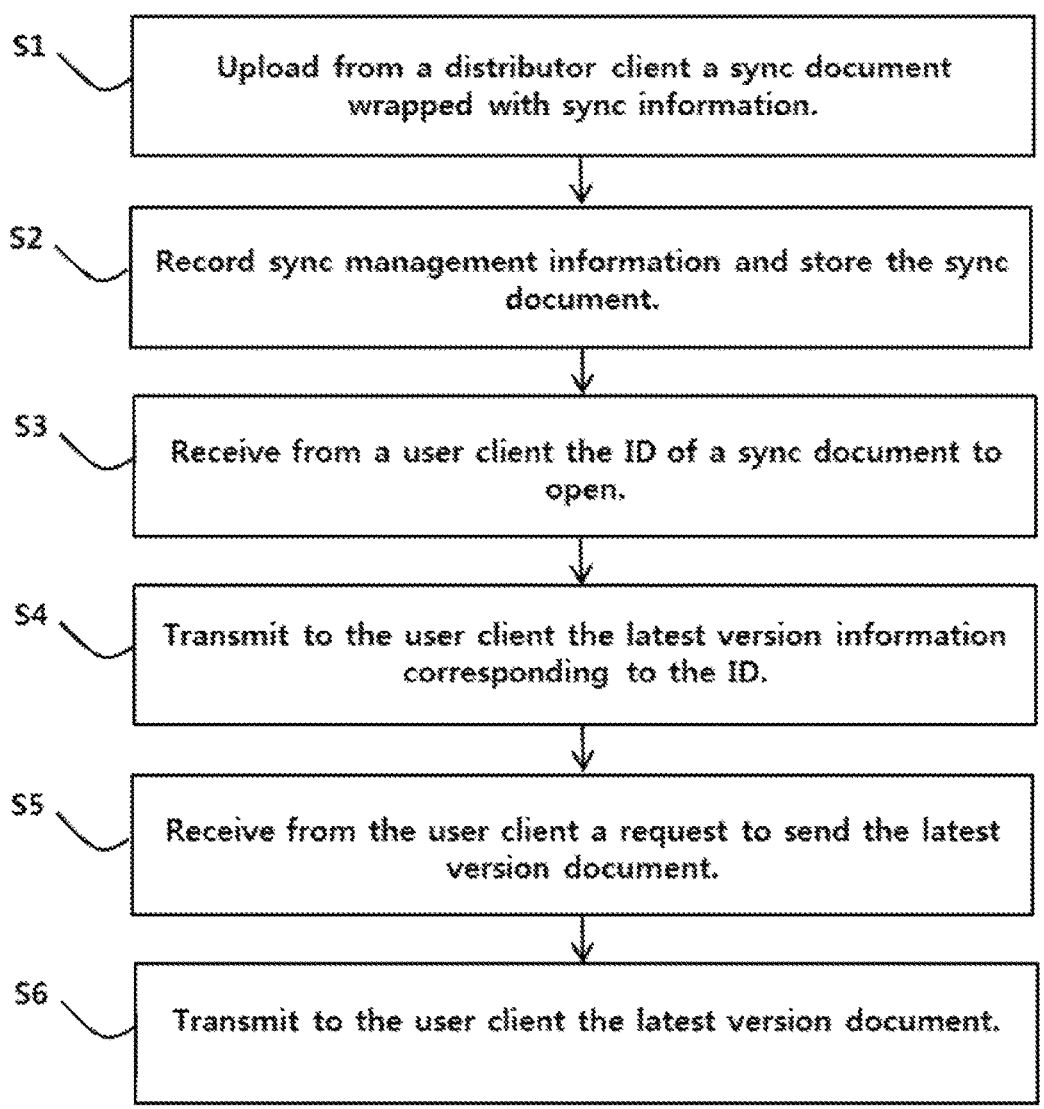

Example FIG. 5 is a flow chart of a document synchronization method, in accordance with embodiments.

Figure 6:
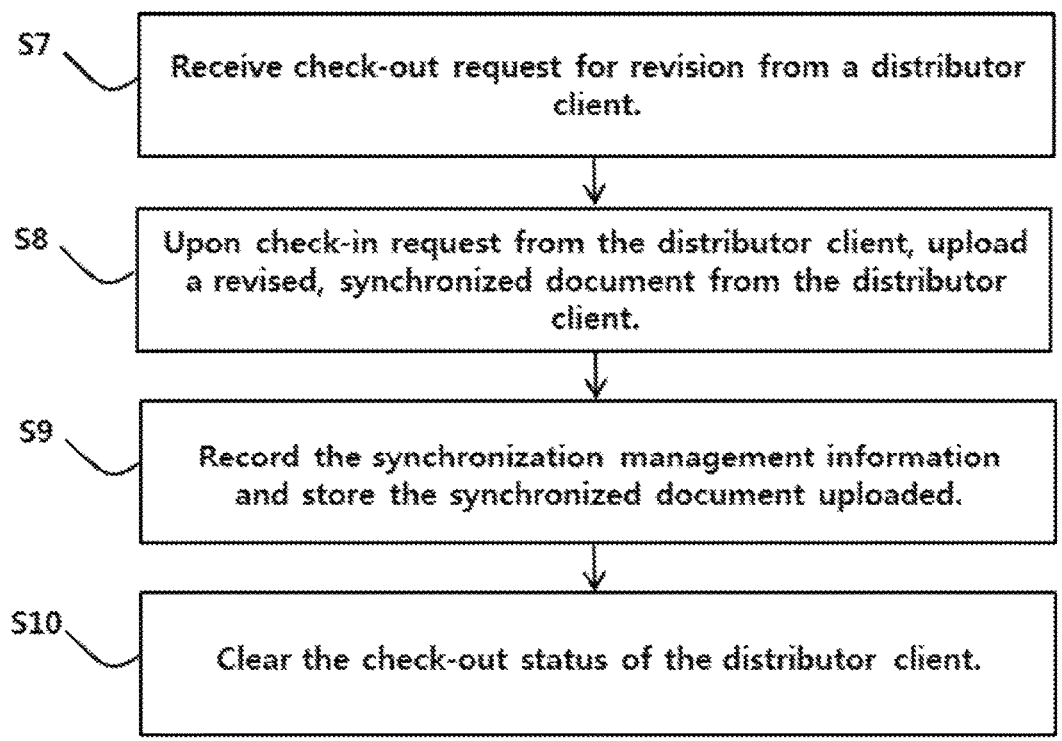

Example FIG. 6 is a flow chart showing a document check-out process where a distributor revises a document, in accordance with embodiments.

Figure 7:
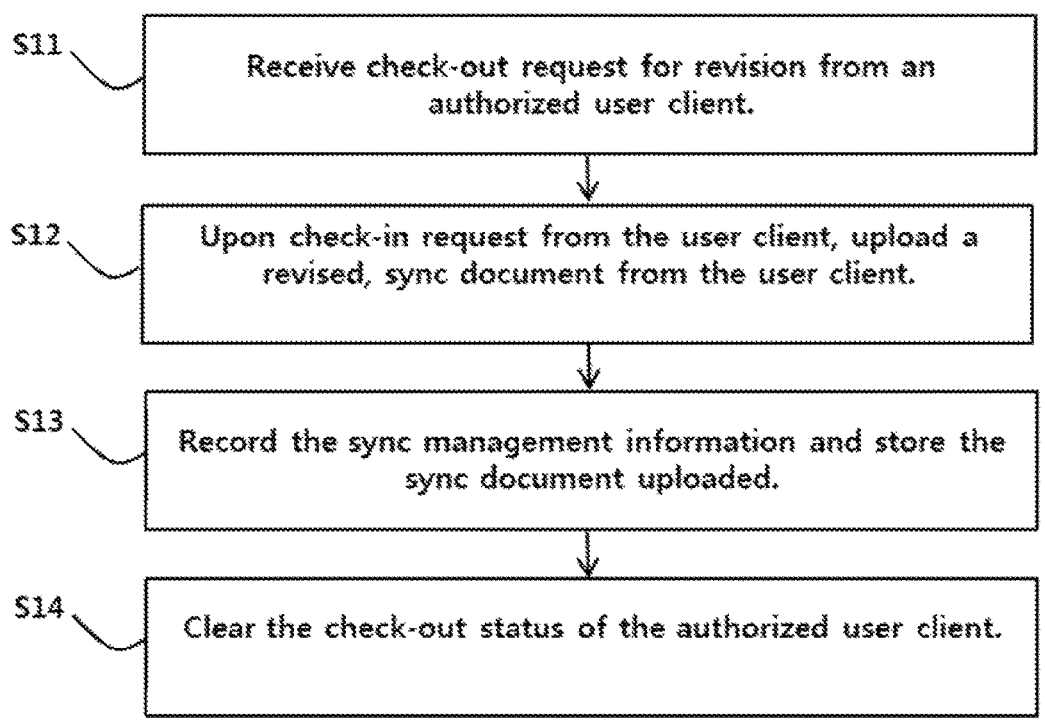

Example FIG. 7 is a flow chart showing a document check-out process where an authorized user revises a document, in accordance with embodiments.

Figure 8:
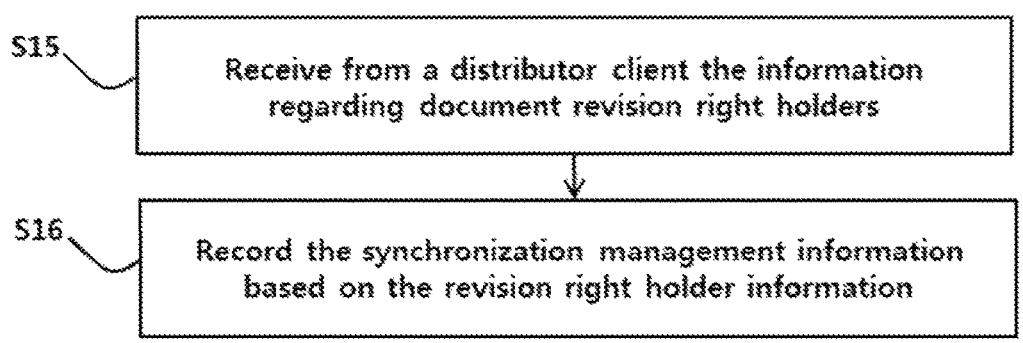

Example FIG. 8 is a flow chart showing a revision right management process amending the information regarding revision right holders, in accordance with embodiments.

Figure 9:
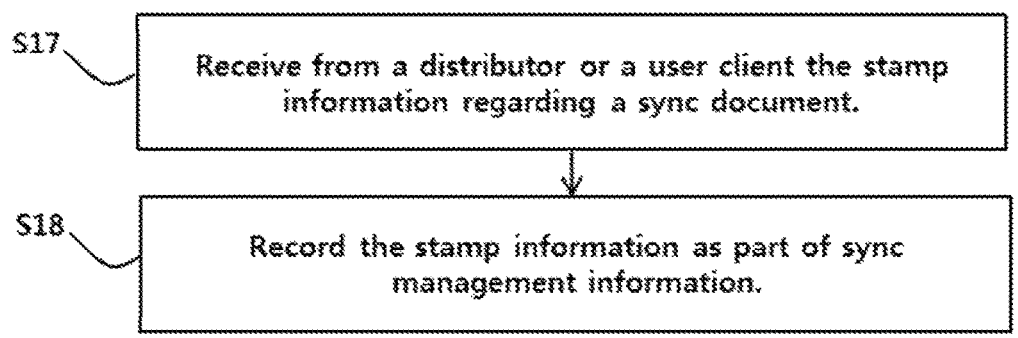

Example FIG. 9 is a flow chart showing a document stamp management process, in accordance with embodiments.

Figure 10:
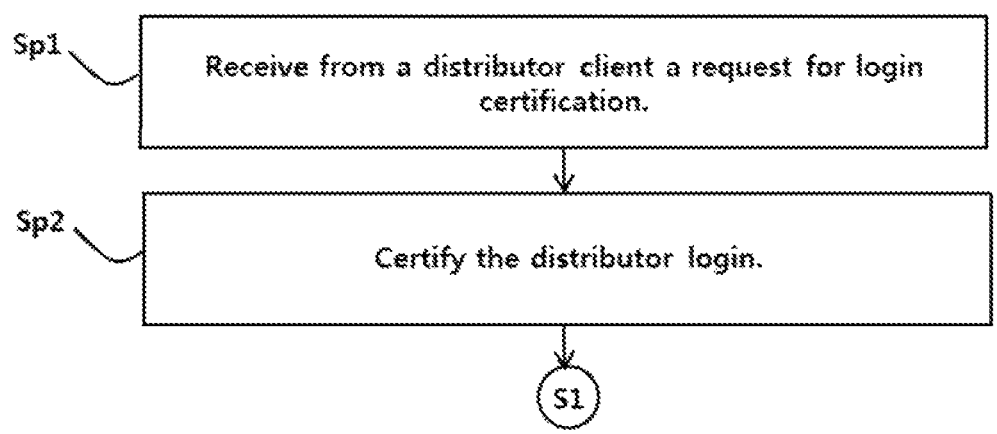

Example FIG. 10 is a flow chart showing a login certification process for a distributor client, in accordance with embodiments.

Figure 11:
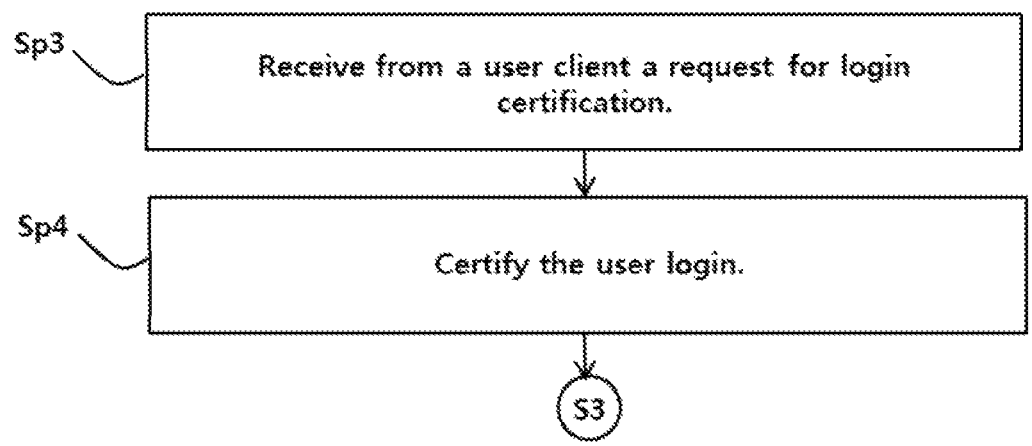

Example FIG. 11 is a flow chart showing a login certification process for a user client, in accordance with embodiments.

Figure 12:
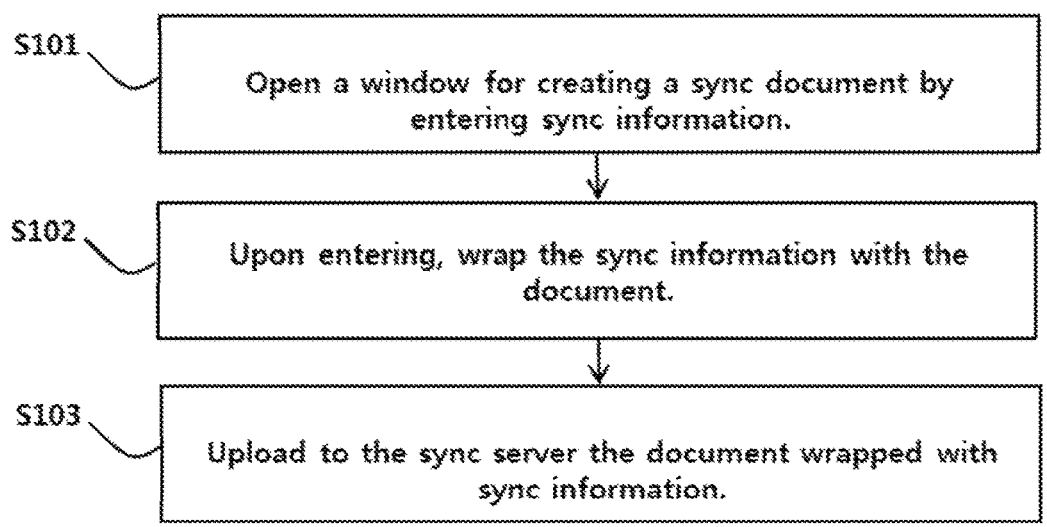

Example FIG. 12 is a flow chart showing a document creation process by a distributor, in accordance with embodiments.

Figure 13:
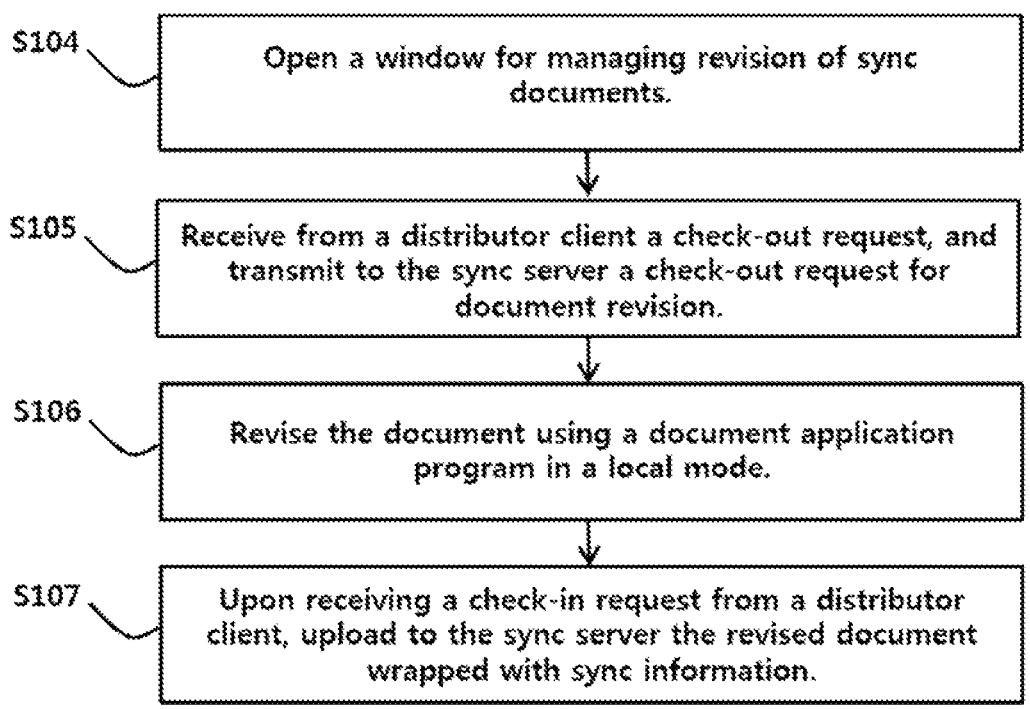

Example FIG. 13 is a flow chart showing a document revision process by a distributor, in accordance with embodiments.

Figure 14:
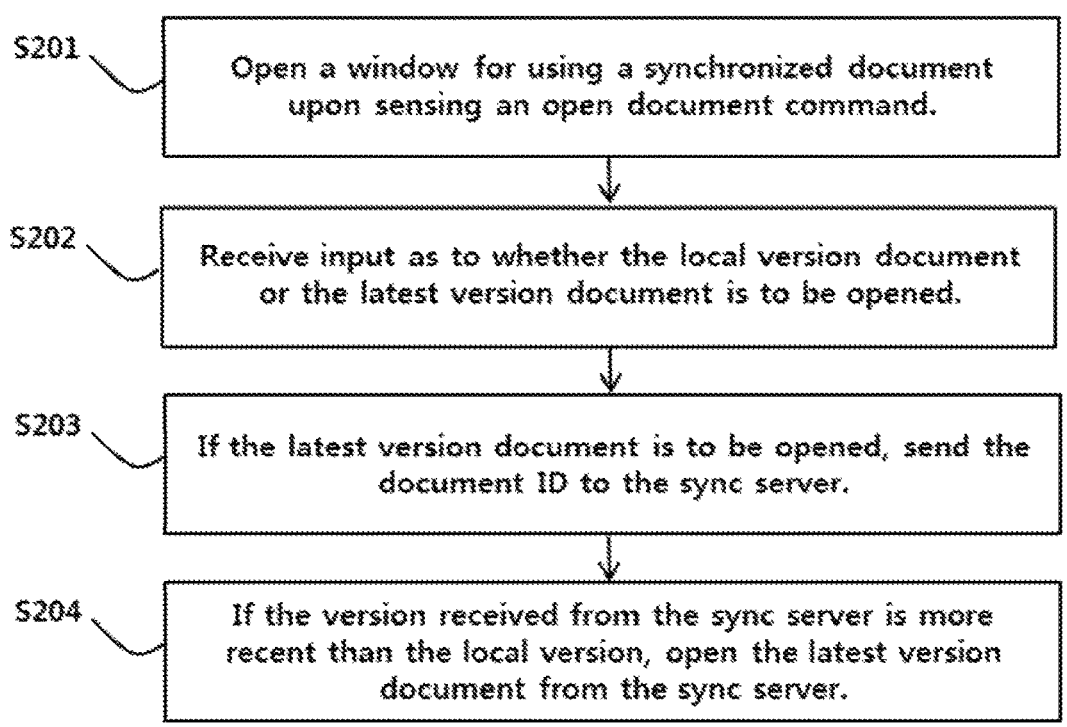

Example FIG. 14 is a flow chart showing a document use process, in accordance with embodiments.

Figure 15:
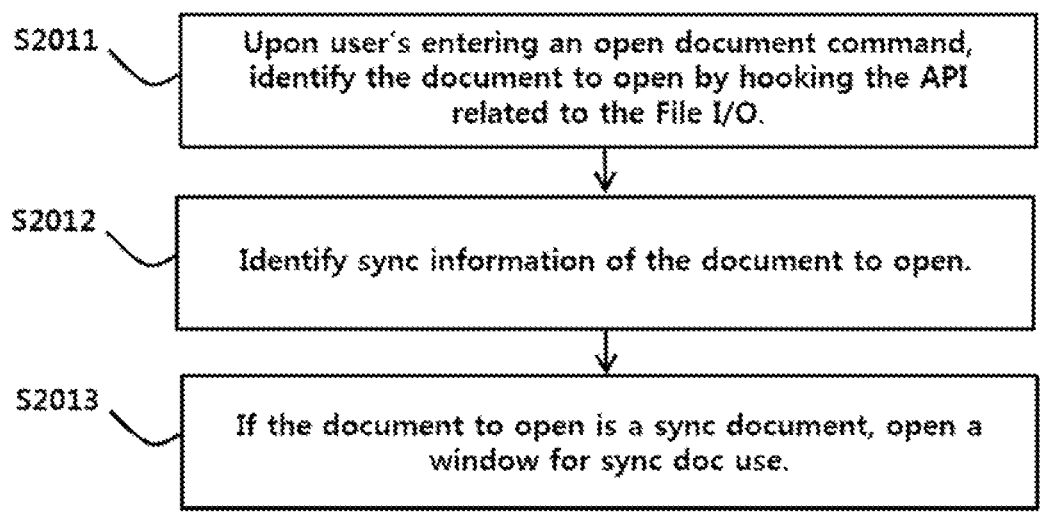

Example FIG. 15 is a flow chart showing S201 in further detail, in accordance with embodiments.

Figure 16:
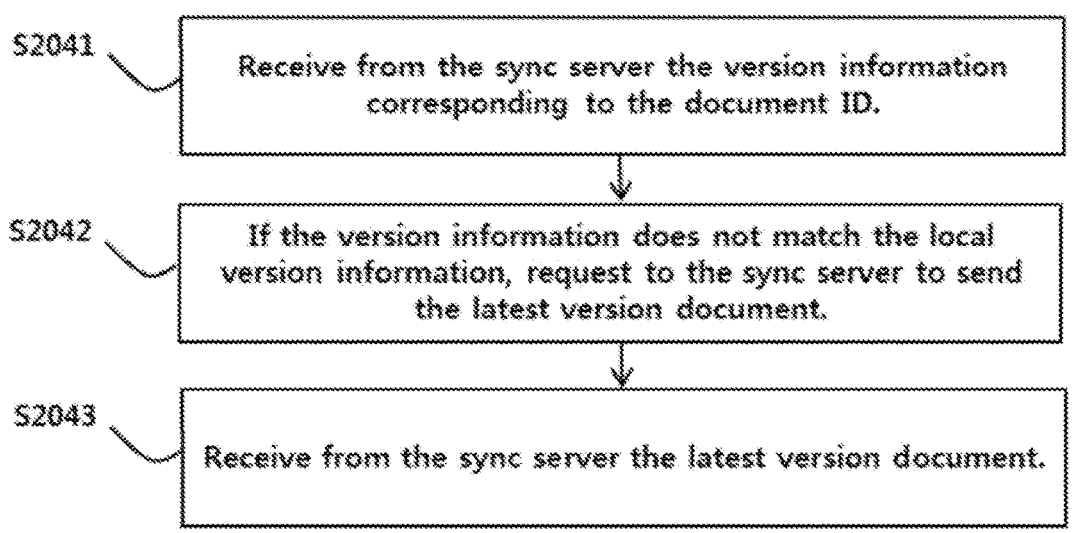

Example FIG. 16 is a flow chart showing S204 in further detail, in accordance with embodiments.

Figure 17:
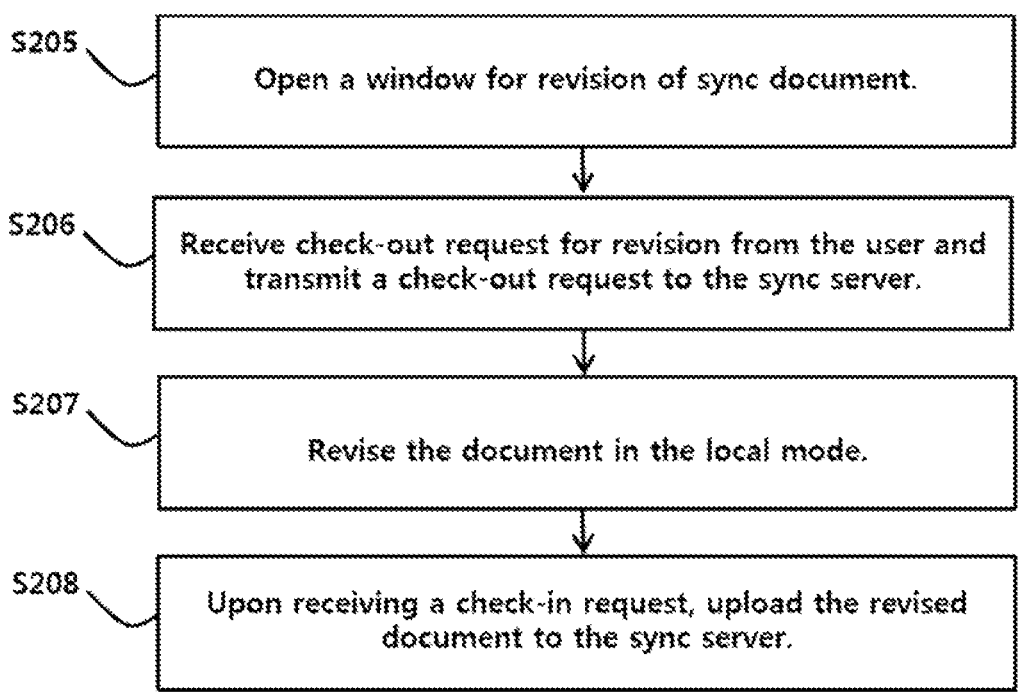

Example FIG. 17 is a flow chart showing a document revision process, in accordance with embodiments.

DESCRIPTION

A server may mean a server in a server-client environment or other meaning understood by one of ordinary skill in the art. The server may be implemented in a general computer means such as a personal computer.

A client may mean a client in a general server-client environment or other meaning understood by one of ordinary skill in the art. The client may be implemented in a computing means such as a personal computer, a smartphone, a tablet PC, a mobile device, or another type of computing device.

Synchronizing may mean the managing of documents in a distributed environment where revisions may occur in local computers while controlling version numbers so that the latest version documents can be identified, stored, and/or retrieved or other meaning understood by one of ordinary skill in the art, in accordance with embodiments.

Synchronization information or Sync Information may mean the information necessary for synchronizing documents such a document ID and a version number or other meaning understood by one of ordinary skill in the art.

Wrapping may mean the recording and/or packaging additional information within a document and managing the information or other meaning understood by one of ordinary skill in the art. Wrapping may generate a synchronized document containing synchronization information for a distributor or user clients to use. Wrapping may include packaging document content with a document header, and digital signature for document authentication. The packaged content with a document header and digital signature data may be encrypted for protection, in accordance with embodiments. In embodiments, the header may be encrypted and the encrypted header may be assembled with the content and the digital signature. In the case where encryption is involved, decryption may be used during the process of managing content, header and signature data.

Document ID may mean a unique identifier assigned to a document or other meaning understood by one of ordinary skill in the art.

Synchronized document or sync document may mean a document with sync information wrapped inside or other meaning understood by one of ordinary skill in the art.

A local document may mean a document stored only in a local computer which is not synchronized or other meaning understood by one of ordinary skill in the art.

Version may mean the number associated with revision of a synchronized document or other meaning understood by one of ordinary skill in the art.

Revision may mean modifying a sync document and uploading the latest version to the sync server or other meaning understood by one of ordinary skill in the art.

Revision right may mean a right to revise a synchronized document and to reflect the revision to the synchronization server (sync server) or other meaning understood by one of ordinary skill in the art.

Checking out or check out may mean an exclusive right to revise a synchronized document or other meaning understood by one of ordinary skill in the art.

Checking in or check in may mean the uploading of a revised document checked out to the sync server, updating its version and releasing the status of checking out or other meaning understood by one of ordinary skill in the art.

Master right may mean the right to grant or withhold a revision right from a user or other meaning understood by one of ordinary skill in the art. A distributor of a document can be a person, entity and/or account that have a master right by default.

A stamp may mean the ability to demonstrate that the designated users of a document confirmed the document, in accordance with embodiments. Stamping may be accomplished by preserving the hash value of the document file, the information regarding the users who stamped the document, and/or the stamping date and time. The first user may designate the users who will stamp the document in the approval chain. The first user can finish the stamping. Once a stamping process is finished, further stamping is not allowed.

Example FIG. 1 is an overall system configuration for document synchronization in accordance with embodiments. FIG. 2 is an example of a server configuration, in accordance with embodiments. FIG. 3 is an example of a client configuration for showing a distributor client and a user client, in accordance with embodiments.

In embodiments, a system may include a distributor client (2000), a user client (2100), and/or a sync server (1000), all connected through a network (10). The sync server (1000) may store a document to be synchronized in connection with the distributor client (2000) and the user client (2100), and manages information for synchronization. The sync server (1000) may include a DB server, a web server, or a storage server.

The distributor client or a user client may be implemented in a general computing means such as a personal computer, a smartphone, a tablet PC, a mobile device, or other general computing device.

Functionally, the sync server (1000) may include a distributor/user management module (1102), a document synchronization management module (1104), a revision control module (1106), a stamp management module (1108), a general management module (1110), and/or a DB management module (1120).

The distributor client (2000) and the user client (2100) may execute a document synchronization program for generating, managing and revising synchronized documents, in accordance with embodiments.

The synchronization program may open a synchronization generation window for inputting synchronization information when a user intention is sensed through user interface. The program may open a document management window for document revision. The program may open a document use window when an open document command is received.

For example, a user may click a document to designate a document be synchronized, and right-click to open a shell menu and entering a shell menu command for opening a synchronization generation window. In another example, a user may double click a document to synchronize and a sync management input window may open automatically.

The synchronization program may include, for example, DLL (dynamic linking library) files for offering a shell menu, recording and extracting document information, transmitting or receiving synchronization information, uploading and downloading a synchronized document, and/or detecting whether a document is open by a document application.

The synchronization program may include a core module for API hooking, in accordance with embodiments. The core module can determine whether a document opened by MS-Word (for example) is a special document requiring document synchronization by detecting the information wrapped inside the document.

Example FIG. 4 is a file composition diagram showing the information wrapped in the document for synchronization, in accordance with embodiments. A document for synchronization may include content data, a header for recording synchronization information, and/or a digital signature for indicating a sync document. The document may be encrypted for a content security purpose. The header may include information such as the document ID, the document creator, the document version number, and/or the creation time, which may be recorded in the XML format. The sync server may record the check-out status, the stamping information for each version, the information regarding revision right holders, and/or document files for each document version.

Example FIG. 5 is a flow chart showing a document synchronization process, in accordance with embodiments. At S1, a distributor client may upload a document wrapped with synchronization information to a sync server. The synchronization information may include at least a document ID and/or a version number, in accordance with embodiments. At S2, the sync server may record the synchronization information and stores the document. S1 and S2 may be repeated to store many documents with synchronization information at the sync server. At S3, the sync server may receive a request from a user client for a document ID. At S4, the sync server may send the information of the most recent version corresponding to the document ID to the user client. The user client may compare the version number received from the synchronized server with the local version number to determine if the local copy is the most recent version. At S5, if the versions are different, the sync server may receive a request for the most recent update version document from the user client. At S6, the sync server may send the latest revision document to the user client.

Example FIG. 6 is a flow chart showing a document check-out process where a distributor revises a document, in accordance with embodiments. At S7, the sync server may receive a check-out request from the distributor client. The check-out request may include a document ID to request an exclusive right to revise the corresponding document. At S8, the distributor client may upload a revised document wrapped with synchronized information to the sync server. At S9, the sync server may store the document for synchronization. At S10, the sync server may then clear the check-out status.

Example FIG. 7 is a flow chart showing a document check-out process where an authorized user revises a document in accordance with embodiments. At S1, the sync server receives a check-out request from the user client. The check-out request includes a document ID to request an exclusive right to revise the corresponding document. At S12, the user client uploads a revised document wrapped with synchronized information to the sync server. At S13, the sync server stores the document for synchronization. At S14, the sync server may then clear the check-out status.

Example FIG. 8 is a flow chart showing a revision right management process that amends the information regarding revision right holders, in accordance with embodiments. At S15, the sync server may receive synchronized information about the revision right holder. At S16, the sync server may record the synchronization management information.

Example FIG. 9 is a flow chart showing a document stamping process, in accordance with embodiments. At S17, the synchronized server may receive stamping information from a distributor client and/or a user client. Stamping information for a document may be a confirmation that some designated users have accessed the document. At S18, the synchronized server may record the stamping information.

Example FIG. 10 is a flow chart, in accordance with embodiments. At Sp1, the synchronized server may receive a request from the distributor client for login certification. At Sp2, S1 may be executed if the login certification is completed.

Example FIG. 11 is a flow chart, in accordance with embodiments. At Sp3, the synchronized server may receive a request from the user client for login certification. At Sp4, S3 may be executed if the login certification is completed.

Example FIG. 12 is a flow chart showing a document creation process by a distributor, in accordance with embodiments. At S101, the distributor client may open a window for document creation. At S102, the distributor client may wrap the document with the synchronization information. At S103, the distributor client may upload the document to the synchronized server.

Example FIG. 13 is a flow chart showing a document revision process by a distributor, in accordance with embodiments. At S104, the distributor client may open a window for document revision. At S105, the distributor client may send a check-out request. At S106, the distributor client may revise the document in a local mode. At S107, the distributor client may upload the revised document to the sync server.

Example FIG. 14 is a flow chart showing a document use process, in accordance with embodiments. At S201, a user client may open a window for using sync documents. At S202, the user client may receive an input from the user if the local version and/or the most recent update version is being used. At S203, the user client may transmit the document ID) to the synchronized server if the user wants the most recent update version document. At S204, if the version stored in the synchronized server is more recent than the locally stored version, the user client may open the version received from the sync server.

Example FIG. 15 is a flow chart showing S201 in further detail, in accordance with embodiments. At S2011, the user client may identify the document that a user is trying to open by hooking the API related to File I/O. At S2012, the user client may identify the synchronization information associated with the document. At S2013, the user client may open a window for using sync documents if the document is a sync document wrapped with synchronization information.

Example FIG. 16 is a flow chart showing S204 in further detail, in accordance with embodiments. At S2041, the user client may receive from the synchronized server the most recent version number corresponding to the document ID transmitted. At S2042, if the received version number and the local version number do not match, the user client may request the synchronized server for the most recent update version document. At S2043, the user client may receive the most recently updated document.

Example FIG. 17 is a flow chart showing a document revision process, in accordance with embodiments. Revision of a sync document may only be made by an authorized user granted an authority to revise the document. At S205, a user client may open a window for synchronization management. At S206, the user client may receive a check-out request from the user, and transmits the check-out request to the synchronized server. At S207, the user client may revise the document checked out from the synchronized server using a document application program such as MS-Word. At S208, the user client may upload the revised document to the synchronized server.

It will be obvious and apparent to those skilled in the art that various modifications and variations can be made in the embodiments disclosed. This, it is intended that the disclosed embodiments cover the obvious and apparent modifications and variations, provided that they are within the scope of the appended claims and their equivalents.

What is claimed is:

1. A method comprising:
   wrapping at least one of a document ID, version information, and document content in a synchronized document by a distributor client;
   uploading the synchronized document to a synchronization server by the distributor client;
   identifying, before the user client opens the local copy of the synchronized document, the synchronized document on the synchronization server corresponding to the local copy of the synchronized document that is requested to be opened, wherein the identifying the synchronized document on the synchronization server is performed after the user client accesses the local copy of the synchronized document;
   requesting latest version information of the synchronization document from the synchronization server;
   receiving from the synchronization server the latest version information of the synchronized document;
   receiving from the synchronization server the synchronized document if the synchronized document is more recent than the local copy of the synchronized document; and
   opening the synchronized document by the user client.

2. The method of claim 1, wherein the method is for synchronizing documents in a distributed server-client environment with the synchronization server storing a latest version of the synchronized document and managing synchronization of the synchronized document among local copies existing in client devices.

3. The method of claim 2, wherein the storing the latest version of the synchronized document comprises:

checking out the synchronized document for revision; and checking in the synchronized document after revision of the synchronized documents as a revised document.

4. The method of claim 1, comprising opening a distributor client window for creating the synchronized document.

5. The method of claim 1, comprising opening a user client window for selecting the synchronization document on the synchronization server or the local copy of the synchronized document.

6. The method of claim 1, wherein said identifying the synchronized document is through hooking the local copy of the synchronized document.

7. The method of claim 1, comprising initiating a stamp process to the synchronized document to ensure that designated users of the synchronized document have at least one of accessed or confirmed the synchronized document.

8. The method of claim 1, comprising displaying a revision history of the synchronized document.

9. The method of claim 1, comprising displaying usage of the synchronized document.

10. The method of claim 1, comprising displaying a relationship between the synchronized document and another synchronized document.

11. The method of claim 1, wherein the requesting latest version information of the synchronization document from the synchronization server is performed if the user client desires a most recent version of the synchronized document.

\* \* \* \* \*